United States Patent [19]

Shigeoka et al.

[11] Patent Number: 5,434,930
[45] Date of Patent: Jul. 18, 1995

[54] FUZZY NEURON FOR PATTER RECOGNITION

[75] Inventors: Fumiaki Shigeoka; Masanari Oh, both of Fukuoka, Japan

[73] Assignee: Rohm Co., Ltd., Kyoto, Japan

[21] Appl. No.: 160,274

[22] Filed: Dec. 2, 1993

[30] Foreign Application Priority Data

Jan. 29, 1993 [JP] Japan ................... 5-014185

[51] Int. Cl.⁶ .................................... G06K 9/62
[52] U.S. Cl. ........................ 382/159; 382/218
[58] Field of Search ............ 382/14, 15, 30, 34, 382/36–39; 395/3, 61, 900; G06K 9/62, 9/68, 9/70, 9/74; G06F 15/00

[56] References Cited

U.S. PATENT DOCUMENTS

| | | | |
|---|---|---|---|
| 5,131,073 | 7/1992 | Furuta et al. | 382/14 |
| 5,202,954 | 4/1993 | Miyazawa et al. | 395/3 |
| 5,227,678 | 7/1993 | Han et al. | 395/3 |
| 5,272,657 | 12/1993 | Basehore et al. | 382/34 |
| 5,295,197 | 3/1994 | Takenaga et al. | 382/14 |

FOREIGN PATENT DOCUMENTS 2-310782  5/1989  Japan ................... G06K 9/62

Primary Examiner—Jose L. Couso
Attorney, Agent, or Firm—Fish & Richardson

[57] ABSTRACT

A pattern recognition method capable of implementing a system suitable for the recognition of a complicated pattern. A reference pattern to be collated with an input pattern is represented using a plurality of membership functions to thereby apply fuzziness to the reference pattern. The input pattern which is input along a cross-detecting line is logically inverted for the production of an inverted input pattern. The input pattern is collated with any one of the plurality of membership functions to judge whether or not the input pattern is provided with at least one of the features of the reference pattern. Also, the inverted input pattern is collated with any one of the other membership functions to thereby judge whether or not the input pattern is provided with at least another one of the features of the reference pattern. The results of these inversions are synthesized. If the obtained result indicates that the input pattern sufficiently matches the reference pattern, then the input pattern is recognized to be a pattern belonging to the same category as the reference pattern.

4 Claims, 10 Drawing Sheets

FUZZY NEURON FOR PATTER RECOGNITION

BACKGROUND OF THE INVENTION a) Field of the Invention

The present invention relates to pattern recognition such as image recognition or voice recognition, and more particularly, is directed to a method of fuzzy-pattern-recognition by using a Fuzzy neuron.

b) Description of the Related Art

As an information processing technique imitating information processing within a living body, a technique using a so-called neuron is known. In this technique, a learning function which the living body possesses is imitated in terms of software or hardware, and hence information processing can be implemented in the form similar to the information processing which is carried out within the human brain.

A fuzzy theory is known as a theory handling fuzzy information. In this theory, a fuzziness which the information contains is represented by membership functions. Since evaluation of the fuzziness is performed, the fuzzy theory can also be considered to be information processing similar to that which is carried out in, for example, the human brain.

A recent investigation has been directed toward the fusion of the fuzzy theory and the neuron. More specifically, so as to be able to recognize a pattern represented by fuzzy information, in other words, a pattern such as a handwritten letter or a picture containing fuzziness, it is anticipated to combine the two. If such a combination can be properly realized, there can be implemented an information processing which is more human, that is, more similar to that which is carried out within, for example, the brain of a human being.

The technique derived from the combination of the fuzzy theory and the neuron still entail a number of problems which have not been solved. For example, consider the case where a membership function capable of describing the fuzziness of a known pattern is used in order to evaluate whether or not the input pattern which is an object of recognition matches the reference pattern. In this case, deciding what kind of membership function should be selected to represent the reference pattern presents a problem.

Consider the recognition of a two-color pattern separately colored "black" and "white", by way of example. In this case, the contents of the membership function to be prepared must be defined differently depending on whether the reference pattern is "a black pattern with a white background" or "a white pattern with a black background". If the reference pattern is "a black pattern with a white background", then a membership function which "regards white as a background" must be used. On the contrary, if the reference pattern is "a white pattern with a black background", then a membership function which "regards white as a pattern" must be used. The importance of presence or absence of defects must be also taken into consideration. In this manner, for the description of the reference pattern to be collated with the input pattern, the contents of the membership function used for the description must be appropriately selected.

Particularly in the case where a pattern consisting of a complicated "black" portion and "white" portion is intended to be recognized, either a large number of membership functions or a membership function having a multiplicity of peaks must be used. In addition, depending on the properties of the reference pattern to be described, it must be decided whether a membership function which "regards white as a background" or a membership function which "regards white as a pattern" is used as the membership function. Such setting would enable the recognition of a complicated pattern.

SUMMARY OF THE INVENTION

It is a First object of the present invention to make recognition of a more complicated pattern possible.

A second object of the present invention is to enable more extensive objects to be recognized.

A third object of the present invention is to extend the type of reference patterns which can be represented by membership functions.

A fourth object of the present invention is to enrich the representation of the reference patterns using the membership functions.

A pattern recognition method of the present invention comprises:

a) a first step for representing a reference pattern having fuzziness by using a plurality of membership functions;

b) a second step for inputting an input pattern;

c) a third step for producing an inverted input pattern by logically inverting the input pattern;

d) a fourth step for collating the input pattern with any one of the plurality of membership functions to judge whether the input pattern is provided with at least some of the features of the reference pattern;

e) a fifth step for collating the inverted input pattern with another of the membership functions to judge whether the input pattern is provided with at least some other features of the reference pattern; and f) a sixth step for synthesizing results of judgments in the fourth and fifth steps, and, if thus obtained result indicates that the input pattern sufficiently matches the reference pattern, recognizing the input pattern to be a pattern belonging to the same category as the reference pattern.

A pattern recognition method of the present invention is implemented by a device, circuit or software executing pattern matching, that is by a fuzzy neuron, based on a theory representing a reference pattern in terms of membership functions which are used in the field of fuzzy inference. The present invention also employs a logical inversion technique for an input pattern to thereby enable various kinds of membership functions to be defined.

More specifically, an input pattern is collated with any one of a plurality of membership functions being defined and, after logical inversion thereof, is collated with another of the membership functions. Each of the membership functions is a function defining at least a part of the features of the reference pattern with fuzziness. Thus, through matching of the input pattern and the logically inverted input pattern with the corresponding membership function, It is Judged whether or not the input pattern is provided with at least two parts of the features of the reference pattern. Through this judgment, if the input pattern sufficiently matches the reference pattern, information can be obtained representing such a fact. In the present invention, if such information is obtained, the input pattern will be recognized as a pattern belonging to the same category as the reference pattern.

According to the present invention, therefore, a variety of membership functions can be properly defined depending on the features of the reference pattern and the objects of recognition. This ensures provision of a means suitable for the recognition of a more complicated pattern. It will be obvious to a person of ordinary skill in the art that tills can be applied to various objects of recognition. The representation of the reference pattern using the membership function or functions will also be enriched.

In the present invention, the input of an input pattern is effected along a cross-detecting line which is set so as to be capable of extracting the features of the reference pattern. The cross-detecting line is a set of sampling points, and may be a straight line or curved line. A plurality of cross-detecting lines may be provided.

The features of the reference pattern can be grasped by the use of concepts of an enabling region and an inhibiting region. The enabling region is a spatial region through which the reference pattern passes, while the inhibition region is a spatial region through which the reference pattern does not pass. If a fact that the reference pattern passes through a certain enabling region is used for the feature extraction from the input pattern, that fact is called an enabling condition. In the same manner, if a fact that the reference pattern does not pass through a certain inhibiting region is used for the feature extraction from the input pattern, that fact is called an inhibiting condition. The cross-detecting line must be set so as to cross at least either of the enabling region or the inhibiting region.

The membership functions capable of being defined are roughly grouped into an enabling membership function and an inhibiting membership function. The enabling membership function is a membership function for extracting or determining, that the input pattern satisfies, in a predetermined enabling region, the enabling condition corresponding to that region. The inhibiting membership function is a membership function for extracting or determining, that the input pattern satisfies, in & predetermined inhibiting region, the inhibiting condition corresponding to that region. These membership functions are all multi-valued functions.

The enabling membership function can be defined as a function with a property presenting a maximum when the input pattern satisfies the enabling condition. On the contrary, the inhibiting membership function can be defined as a function with a property presenting a maximum when the input pattern satisfies the inhibition condition. When using the enabling membership functions and the inhibiting membership functions having such properties, the recognition as to whether or not the input pattern is a pattern belonging to the same category as the reference pattern can be effected on the basis of the respective maximums of the values of the enabling membership functions at points on the cross-detecting line where there are obtained sampling values having a predetermined value or the inverted values of the respective maximums of the values of the inhibiting membership functions at such points. In this case, the input pattern is recognized as a pattern belonging to the same category as the reference pattern if a minimum of the obtained maximums of the enabling membership functions and the inverted maximums of the inhibiting membership functions is sufficiently large.

Moreover, a part concerning the inhibiting membership function among such recognition logic can be modified by use of De Morgan's theorem. More specifically, as each of the inhibiting membership functions, a function with a property presenting a minimum when the input pattern satisfies the inhibiting condition may be used. In order to derive the recognition results, the respective minimums of the values of the inhibiting membership Function values corresponding to points on the cross-detecting line where sampling values are obtained having a predetermined value, as well as the respective maximums of the enabling membership function values, may be used. Such types of inhibiting membership functions are called inverted inhibiting membership functions.

The inverted input pattern can also be processed by the same recognition logic. Since the inverted input pattern is a pattern obtained by logically inverting the Input pattern, the recognition with respect to the inverted input pattern is substantially equal to the recognition of a background of the pattern. Based on such an algorithm, the present invention realizes the recognition of a more complicated pattern.

Techniques such as logical inversion of the input pattern or the definition of enabling/inhibiting membership functions can accomplish recognition more suitable for the object of recognition. For example, in the case of the reference pattern where a plurality of enabling regions exist along a certain cross-detecting line, a multiple-peak enabling membership function involving all of the plurality of enabling regions may be used, or alternatively, a plurality of single-peak enabling membership functions corresponding to the respective enabling regions. The alternative may depend on the object of recognition and the like. The same can be said about the reference pattern where a plurality of inhibiting regions exist along a certain cross-detecting line.

A pattern recognition method of the present invention may be implemented as a fuzzy neuron, for example, comprising:

a) means for inputting and sampling an input pattern along a cross-detecting line crossing at least any one of a first enabling region, a first inhibiting region, a second enabling region, and a second inhibiting region;

b) means for logically inverting the input pattern to produce an inverted input pattern;

c) means for defining a first enabling membership function based on a first enabling condition with a content that a predetermined reference pattern passes through the first enabling region; the first enabling membership function being set so as to have its maximum within the first enabling region;

d) means for defining a first inhibiting membership function based on a first Inhibition condition with a content that the reference pattern does not pass through the first inhibiting region; the first inhibiting membership function being set so as to have its maximum within the first inhibiting region;

e) means for deriving values of the first enabling membership function at a first set of points on the cross-detecting line where sampling values having a predetermined value are obtained;

f) means for deriving a maximum of the values derived by the means recited in e);

g) means for deriving values of the first inhibiting membership function at the first set of points;

h) means for deriving a maximum of the values derived by the means recited in g);

i) means for logically inverting the maximum derived by the means recited in h);

j) means for defining a second enabling membership function based on a second enabling condition with a content that a background of the reference pattern passes through the second enabling region; the second enabling membership function being set so as to have its maximum within the second enabling region;

k) means for defining a second inhibiting membership function based on a second inhibiting condition with a content that the background of the reference pattern does not pass through the second inhibiting region; the second inhibiting membership function being set so as to have its maximum within the second inhibiting region;

l) means for deriving values of the second enabling membership function at a second set of points on the cross-detecting line where sampling values whose inverted values have the predetermined value are obtained;

m) means for deriving a maximum of the values derived by the means recited in l);

n) means for deriving values of the second inhibiting membership function at the second set of points;

o) means for deriving a maximum of the values derived by the means recited in n);

p) means for logically inverting the maximum derived by the means recited in o); and q) means for deriving a minimum value from among the maximum derived by the means recited in f), the inverted maximum derived by the means recited in i), the maximum derived by the means recited in m), and the inverted maximum derived by the means recited in p);

wherein the input pattern is recognized as a pattern belonging to the same category as the reference pattern when the minimum value derived by the means recited in q) is sufficiently large.

Alternately, a fuzzy neuron may comprise:

a) means for inputting and sampling an input pattern along a cross-detecting line crossing at least any one of a first enabling region, a first inhibiting region, a second enabling region, and a second inhibiting region;

b) means for logically inverting the input pattern to produce an inverted input pattern;

c) means for defining a first enabling membership function based on a first enabling condition with a content that a predetermined reference pattern passes through the first enabling region; the first enabling membership function being set so as to have its maximum within the first enabling region;

d) means for defining a first inverted inhibiting membership function based on a first inhibition condition with a content that the reference pattern does not pass through the first inhibiting region; the first inverted inhibiting membership function being set so as to have its minimum within the first inhibiting region;

e) means for deriving values of the first enabling membership function at a first set of points on the cross-detecting line where sampling values having a predetermined value are obtained;

f) means for deriving a maximum of the values derived by the means recited in e);

g) means for deriving values of the first inverted inhibiting membership function at the first set of points;

h) means for deriving a minimum of the values derived by the means recited in g);

i) means for defining a second enabling membership function based on a second enabling condition with a content that a background of the reference pattern passes through the second enabling region; the second enabling membership function being set so as to have its maximum within the second enabling region;

j) means for defining a second inverted inhibiting membership function based on a second inhibiting condition with a content that the background of the reference pattern does not pass through the second inhibiting region; the second inverted inhibiting membership function being set so as to have its minimum within the second inhibiting region;

k) means for deriving values of the second enabling membership function at a second set of points on the cross-detecting line where sampling values whose inverted values have a predetermined inverted value are obtained;

l) means for deriving a maximum of the values derived by the means recited in k);

m) means for deriving values of the second inverted inhibiting membership function at the second set of points;

n) means for deriving a minimum of the values derived by the means recited in m); and o) means for deriving a minimum value from among the maximum derived by the means recited in f), the minimum derived by the means recited in h) the maximum derived by the means recited in l), and the minimum derived by the means recited in n);

wherein the input pattern is recognized as a pattern belonging to the same category as the reference pattern when the minimum value derived by the means recited in o) is sufficiently large.

DESCRIPTION OF THE PREFERRED EMBODIMENTS

Figure 1:
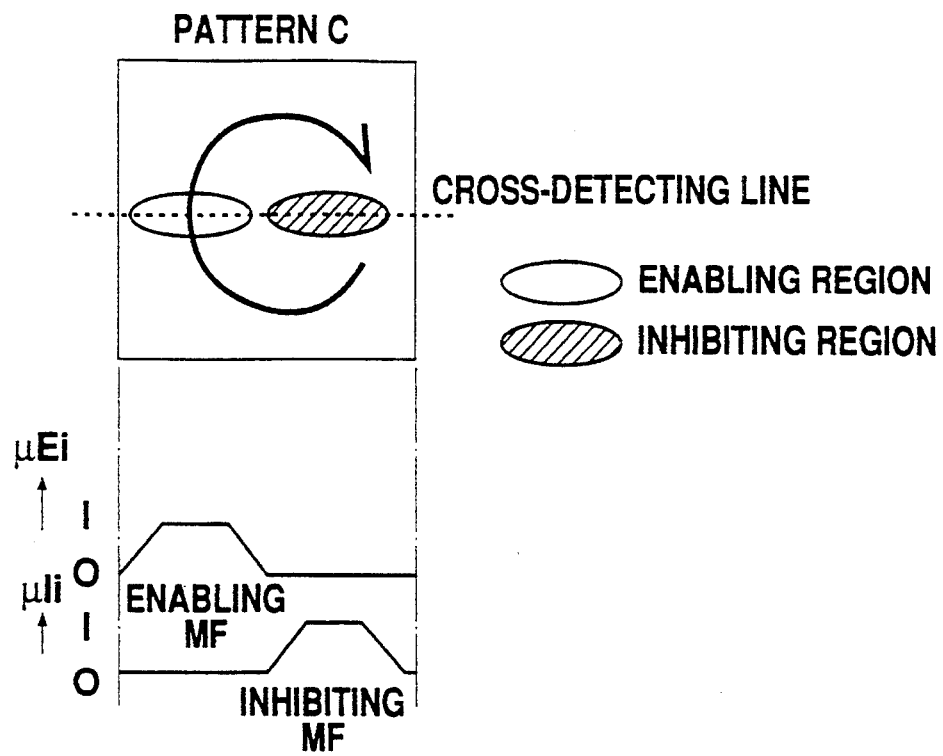
FIG. 1 illustrates, by way of example, membership functions to be defined when a fuzzy neuron is intended to recognize a pattern "C"

Presently preferred exemplary embodiments of the present invention will be described hereinbelow with reference to the accompanying drawings in which members having substantially the same function are designated by a common reference numeral, and hence the description thereof will not be repeated.

Recognition Principle in Fuzzy Neuron

The following is an explanation of an example of a recognition principle in a fuzzy neuron of the present invention.

The fuzzy neuron in accordance with the present invention is intended to judge to what degree an externally applied input pattern matches a reference pattern represented by membership functions. The representation of the reference pattern in terms of the membership functions allows the reference pattern to include fuzziness, to realize a recognition processing closer to that in the human brain, or a so-called "soft" pattern matching in the fuzzy neuron of the present invention. The pattern matching is processing in which it is judged whether an externally applied input pattern sufficiently matches a predetermined pattern (which is called the reference pattern), in other words, whether the degree of matching is high or not to thereby recognize the input pattern. The "soft" pattern matching means a pattern matching permitting fuzziness to some extent in the case of judgment of the degree of matching of the input pattern with respect to the reference pattern. Therefore, the soft matching pattern to be realized by the fuzzy neuron may be suitable for the recognition of the input pattern such as, for example, handwritten letters inherently including fuzziness.

A technique which the fuzzy neuron employs to realize the "soft" pattern matching is one representing the reference pattern in terms of the membership functions. The functions are a multi-valued function representing fuzziness as is well known in the field of fuzzy processing and having a range, for example, from 0 to 1. Therefore, the representation of the reference pattern in terms of the membership functions means imparting fuzziness to the reference pattern.

The membership functions for use in the fuzzy neuron are defined along a cross-detecting line. The cross-detecting line is a set of sampling points and is so provided as to be capable of extracting a feature or features of a reference pattern having fuzziness in the form of distributing signals when sampling the reference pattern along that cross-detecting line. In the fuzzy neuron, an input pattern is sampled along the cross-detecting line to produce distributing signals for the judgment of degree of matching through an operation based on the distribution signals. Thus, if all applied input pattern has a feature or features common to the reference pattern, then the input pattern is considered to properly match the reference pattern. In other words, it is recognized that the input pattern substantially conforms to the reference pattern. The cross-detecting line is not limited to a straight line, and a plurality of cross-detecting lines may be provided. It is to be noted that the cross-detecting line must be provided in such a manner as to be capable of extracting the feature or features of a pattern to be recognized in the form of the distributing signals which are obtained as the result of sampling.

The membership functions to be used in the fuzzy neuron include an enabling membership function and an inhibiting membership function. The enabling membership function is used in judging whether the applied input pattern satisfies an enabling condition, while the inhibiting membership function is used to judge whether the applied input pattern satisfies an inhibiting condition. The enabling condition means a condition definitely enabling a reference pattern having fuzziness through a certain region, and the inhibiting condition means a condition never enabling the reference pattern through a certain region. A region through which a reference pattern having fuzziness definitely pass is called an enabling region, while a region through which a reference pattern having fuzziness does not pass is called an inhibiting region. The cross-detecting line described above must be so provided as to cross at least one of the enabling regions and inhibiting regions.

By way of example, consider a handwriting pattern "C" with a black letter on a white background as shown in FIG. 1. This pattern "C" is handwritten and hence entails some fuzziness. In the figure, although the pattern has fuzziness, such a pattern (i.e. a black letter) will pass through a region represented by a white ellipse, but will not pass through a region represented by a hatched ellipse. In the shown example, therefore, the region represented by the white ellipse is the enabling region, and the region represented by the hatched ellipse is the inhibiting region.

In order to ensure the recognition of an input pattern having features common to the reference pattern shown in this figure, the cross-detecting line must be provided in such a manner as is shown by a broken line, for example. Then, as seen at the bottom of FIG. 1, the enabling membership function (shown as an enabling MF) is defined in response to the enabling condition associated with the enabling region represented by the white ellipse, while the inhibiting membership function (shown as an inhibiting MF) is defined in response to the inhibiting condition associated with the inhibiting region. The enabling and inhibiting MFs must be provided with respective flat peaks corresponding to the enabling and inhibiting region, and each of the peaks must have a predetermined width in the corresponding region to represent the fuzziness of the reference pattern. The judgment on the enabling condition and the inhibiting condition in the fuzzy neuron can be implemented by referring to values of the enabling membership function and the inhibiting membership function based on values of the distributing signals which are obtained along the cross-detecting line, and by subjecting the thus obtained functional values to predetermined processing.

The following is a more detailed description of the judgment on the enabling condition and the inhibiting condition.

Providing that the handwritten pattern "C" shown in FIG. 1 is sampled along the cross-detecting line shown by the broken line, then a sample value corresponding to "black" is obtained at a certain point within the enabling region represented by the white ellipse, whereas sample values corresponding to "white" are obtained across the inhibiting region represented by the hatched ellipse. In the case of the example shown in FIG. 1, therefore, the enabling condition is to be capable of obtaining a sample value corresponding to "black" at a certain point within the enabling region represented by the white ellipse, and the inhibiting condition is to be capable of obtaining sample values corresponding to "white" across the inhibiting region designated by the hatched ellipse.

Figures 2, 3:
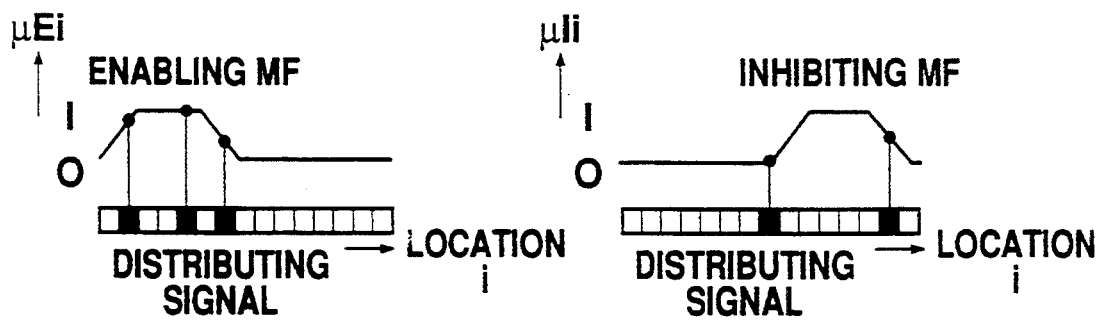
FIG. 2 is a diagram for the explanation of an enabling condition defined by an enabling membership function in FIG. 1 example.
FIG. 3 is a diagram for the explanation of an inhibiting condition defined by an inhibiting membership function in FIG. 1 example.

Suppose that distributing signals as shown in FIG. 2 are being obtained along the FIG. 1 cross-detecting line, particularly in the left half thereof, when an input pattern is applied. As shown in FIG. 2, there are obtained sample values (or distributing signal values) corresponding to "black" at certain sampling points (hereinbelow referred to as locations) along the cross-detecting line, and distributing signal values corresponding to "white" at the remaining locations. The fuzzy neuron derives a maximum $vuE1$ of values $uEi$ of the enabling membership function at respective locations 1, where the operator v represents a maximum function.

If a distributing signal value corresponding to "black" is obtained at one or more locations belonging to the peak (or a part including locations where the enabling membership function has a value 1) of the enabling membership function, then the maximum $vuEi$ is equal to 1. On the contrary, if no distributing signal values corresponding to "black" are obtained at locations belonging to the peak of the enabling membership function, but non-zero distributing signal values corresponding to "black" appear at locations belonging to the foot of the enabling membership function, then the maximum $vuE1$ is equal to the maximum of the non-zero distributing signal values. Accordingly, by virtue of the above-described maximum operation, information $vuEi$ indicating to what degree the black pattern properly passes through the peak or the foot of the enabling membership function can be obtained. In other words, by use of such an enabling membership function as is shown in FIG. 2, the degree of satisfaction of the enabling condition with respect to the black pattern can be recognized. The enabling membership function as shown in FIG. 2 serves to recognize the degree of satisfaction of the enabling condition with respect to the black pattern to thereby collate the input pattern features with the reference pattern features, and hence can be called a black-associated enabling membership function or an enabling membership function with respect to black.

In the same manner, suppose that distributing signals as shown in FIG. 3 are being obtained along the FIG. 1 cross-detecting line, particularly in the right half thereof, when an input pattern is applied. There are shown obtained distributing signal values corresponding to "black" at certain locations along the cross-detecting line, and distributing signal values corresponding to "white" at the remaining locations. The fuzzy neuron finds a maximum $vmIi$ of values $uIi$ of the inhibiting membership function at respective locations i, and then inverts them.

If there is obtained a distributing signal value corresponding to "black" at one or more locations belonging to the peak of the inhibiting membership function, then the inverted values of the maximum $vuIi$ is equal to 0. On the contrary, if no distributing signal values corresponding to "black" are obtained at locations belonging to the peak of the inhibiting membership function, but distributing signal values corresponding to "black" appear at locations belonging to the foot of the inhibiting membership function, then inverted values of the maximum $vuIi$ are equal to inverted values of the distributing signal values obtained at corresponding locations. Accordingly, through the above-described maximum/inversion operation there can be obtained information $vuIi$ indicating the degree of "whether the black pattern definitely does not pass through the peak or the foot of the inhibiting membership function".

In other words, by use of such inhibiting membership function as shown in FIG. 3 there can be recognized the degree of satisfaction of the inhibiting condition with respect to the black pattern. The inhibiting membership function as shown in FIG. 3 serves to recognize the degree of satisfaction of the inhibiting condition with respect to the black pattern to thereby collate the input pattern features with the reference pattern features, and hence can be called a black-associated inhibiting membership function or an inhibiting membership function with respect to black.

In a case where it is Judged through these processes that the enabling condition and the inhibiting condition are sufficiently satisfied in the input pattern, this input pattern can be considered to substantially match the reference pattern.

The Judgment equation of degree of matching concerning the inhibiting condition can be modified by using de Morgan's theorem. That is, $vuIi$ can be modified as $(uIi)$ where represents a minimum function.

Figure 4:
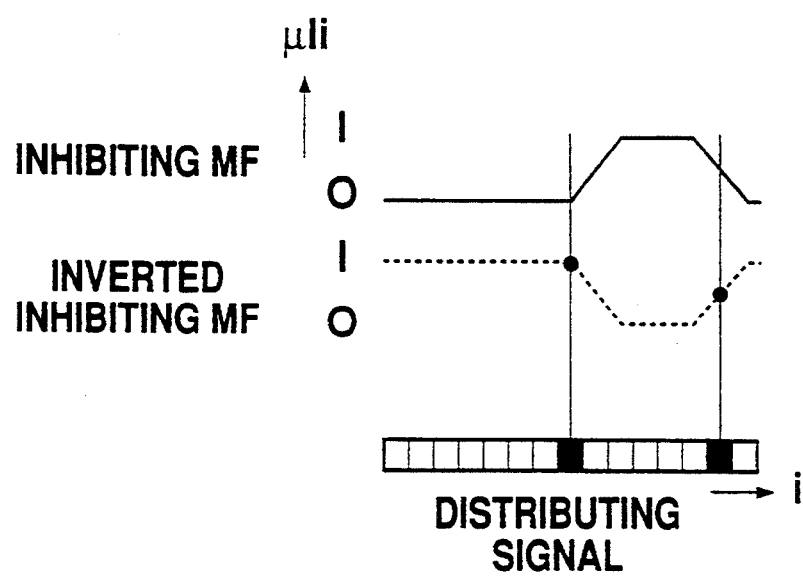
FIG. 4 is a diagram illustrating a modified example of the inhibiting membership function shown in FIGS. 1 and 3 based on De Morgan's theorem.

Based on this fact, as shown in FIG. 4, the judgment can also be implemented by previously inverting the inhibiting membership function and deriving the minimum of the inverted inhibiting membership function with respect to the locations where "black" distributing signal values are obtained.

The fuzzy neuron generally executes the Judgment of degree of matching concerning the enabling conditions and the inhibiting conditions with respect to all the feature cross-detecting lines. From among thus obtained plural types of degree of matching, the fuzzy neuron selects the minimum value for output. This output value indicates to what degree the input pattern satisfies the enabling conditions and inhibiting conditions representative of the features of the reference pattern, output value, i.e. If the resultant degree of matching is sufficiently large, the input pattern can be considered to be a pattern belonging to the same category as the reference pattern. On the contrary, if the degree of matching is not sufficiently large, the input pattern can be considered to be a pattern belonging to different category from the reference pattern.

In this manner, the fuzzy neuron implements pattern recognition on the basis of the distributing signal values obtained by sampling the input pattern and the membership functions represent the reference pattern. The fuzzy neuron can recognize a pattern having fuzziness as it is a multi-valued function. It was impossible to carry out such recognition through the conventional information processing using a binary representation.

Setting Procedure of Membership Function serving as a Premise of the Present Invention Deciding which color should be regarded as a pattern is a critical problem for setting membership functions. Assuming that the color consists of only white and black for simplification, this problem can be represented as "the background is white and the pattern is black, or alternatively the background is black and the pattern is white". Depending on how to deal with this problem, that is, how to set the membership functions, the results of the Judgment of degree of matching may differ.

Figure 5:
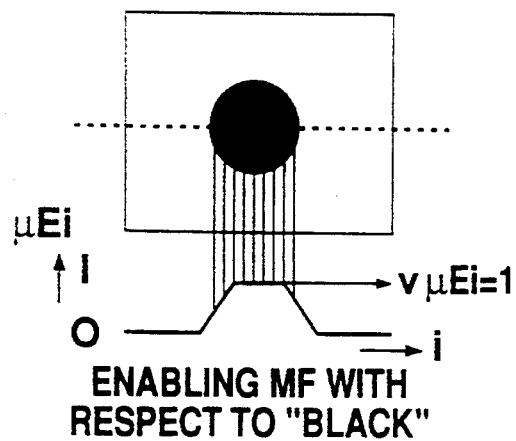
FIG. 5 is a diagram showing an example of the enabling membership function for the recognition of a pattern "black circle"

For example, consider a black circle with a white background as shown in FIG. 5. Also set a cross-detecting line in such a manner as shown by a broken line in the figure. In this case, the central black circle is regarded as a pattern, and the surrounding white area is treated as a background. Under these circumstances, it is an enabling condition to be grasped in the simplest manner that the cross-detecting line crosses this black circle, which results in an adoption of an enabling membership function with respect to black.

Figure 6:
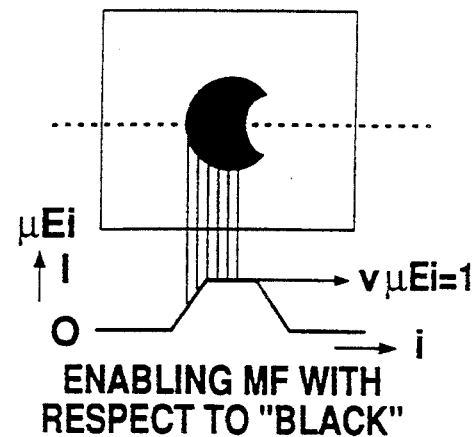
FIG. 6 is a diagram for explaining an erroneous recognition which may take place when executing the judgment of degree of matching with a pattern "black circle whose right edge disappears" using the enabling membership function shown in FIG. 5.
Figure 7:
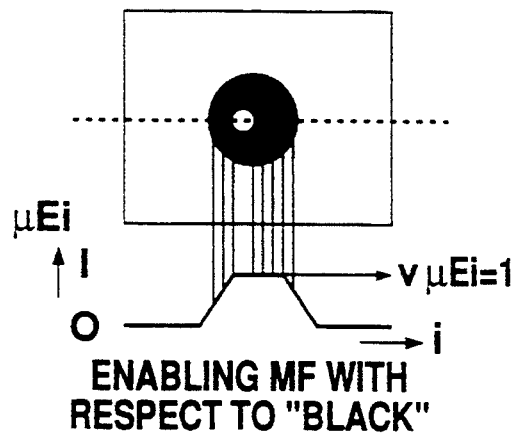
FIG. 7 is a diagram for explaining an erroneous recognition which may take place when executing the judgment of degree of matching with a pattern "black circle a part of the interior of which is missing" using the enabling membership function shown in FIG. 5.
Figure 8:
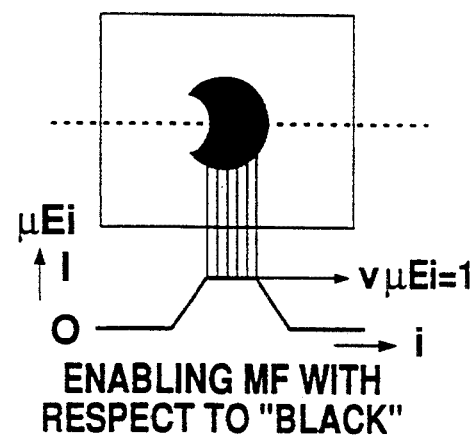
FIG. 8 is a diagram for explaining an erroneous recognition which may take place when executing the judgment of degree of matching with a pattern "black circle whose left edge disappears" using the enabling membership function shown in FIG. 5.

For such simple setting of the membership functions, the judgment of degree of matching may possibly lead to an inadequate result if an input pattern involving white defects is applied. In the case, for example, where the right edge of the black circle disappears as shown in FIG. 6, where the black circle includes at its center a white small circle as shown in FIG. 7, or where the left edge of the black circle disappears as shown in FIG. 8, the maximum vuE1 becomes equal to 1 irrespective of such defects. Therefore, it is not preferable to set the enabling membership function as shown in FIG. 5 if the presence or absence of the white defects is critical.

Figure 9:
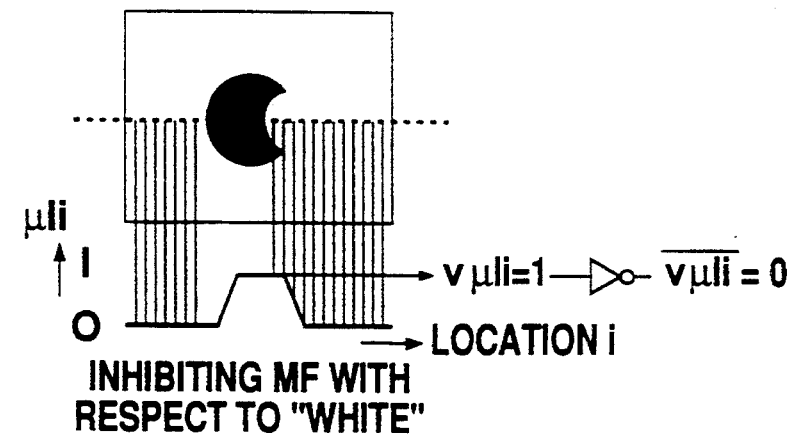
FIG. 9 is a diagram illustrating, by way of example, an inhibiting membership function for the recognition of a pattern "black circle" while preventing such erroneous recognition as shown in FIGS. 6 to 8.

Such inconvenience may arise from the setting of the membership functions with respect to "black". Hence, in order to prevent this inconvenience and to detect a white defect, there must be provided a membership function with respect to "white". More specifically, it is to be grasped as an inhibiting condition that the cross-detecting line crosses this black circle as shown in FIG. 9, and there must be provided an inhibiting membership function with respect to "white". Then, the maximum vuIi of the inhibiting membership function is equal to 1 if there is a white defect present similar to that in FIG. 6. Through the inversion of this value, a degree of matching results in "0". In this manner, membership functions should be provided with respect to white in the case where the presence or absence of white is the criterion for recognition.

Figure 10:
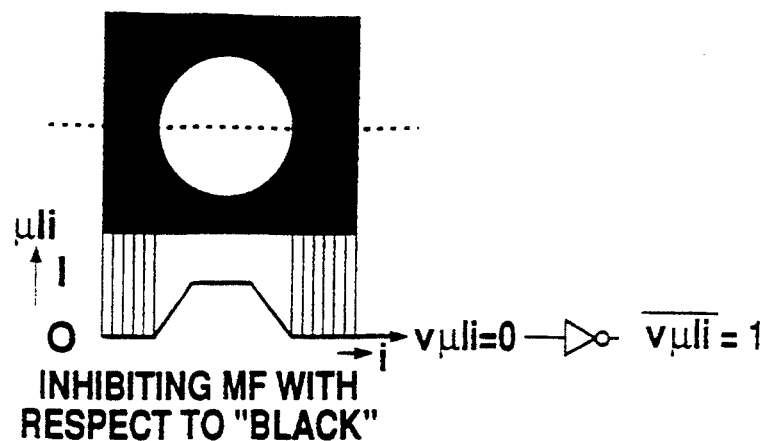
FIG. 10 is a diagram illustrating, by way of example, an inhibiting membership function for the recognition of a pattern "black rectangle including a white circle"

By way of a second example, consider "a white circle in a black rectangle" as shown in FIG. 10, and a cross-detecting line being so set as to be shown by a broken line in the figure. Provided that the black rectangle is regarded as a pattern and that the surrounding white and the central white circle are treated as a background in this example, it is to be grasped in the simplest manner as an inhibiting condition that the cross-detecting line crosses this white circle, and there is provided a inhibiting membership function with respect to "black" as shown in the same figure.

Figure 11:
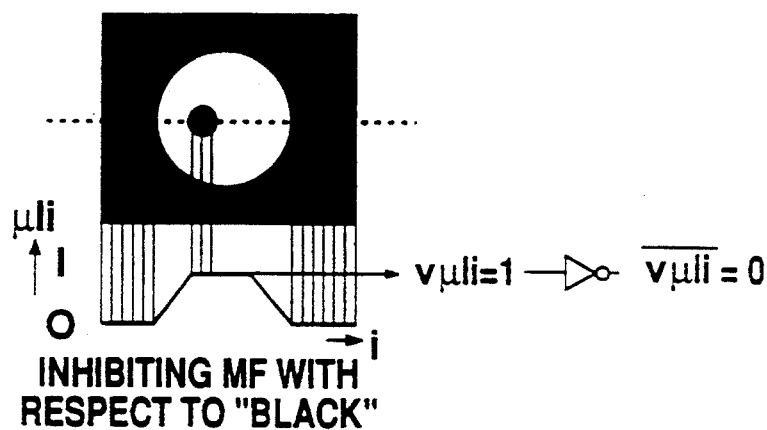
FIG. 11 is a diagram for the explanation of an erroneous recognition which may take place when executing the judgment of degree of matching with a pattern "black rectangle including a white circle, the white circle involving a black circle therein.

Such simple setting of the membership function may possibly result in an inadequate value in the judgment of degree of matching if an input pattern involving black defects is applied. In the case, for example, where a black circle exists within a white circle as shown in FIG. 11, the maximum vuIi becomes equal to 0 due to the presence of the black circle. Such a value is problematic if the presence or absence of the black circle is not so essential. More specifically, it is desirable to obtain the degree of matching value of "1" irrespective of the pattern as shown in FIG. 11 if only a white part has to exist at its center, and therefore the membership function as shown in FIG. 10 is unsuitable.

Figure 12:
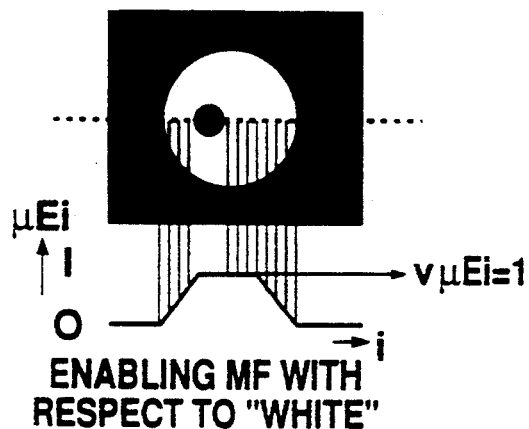
FIG. 12 is a diagram illustrating an example of an enabling membership function for the recognition of a pattern "black rectangle including a white circle, the white circle permitting the presence of a black circle therein"

Preferably, in the case of this example, there is provided an enabling membership function with respect to white as shown in FIG. 12. Then, in spite of the presence of the black circle, the maximum vuE1 becomes 1 due to the presence of the white part, and hence such a membership function will be preferable. That is, it is preferable to set an enabling membership function with respect to white if the presence or absence of black defects is not essential.

Problems in Complicated Patterns

As described hereinabove, the contents of the definition of membership functions that the membership function is associated with white or black and that it is to be enabling or inhibiting may differ depending on such circumstances as which of white or black should be regarded as a pattern or as a background, and whether the presence of defects is essential or not in view of the object of recognition. Conversely, this means that any complicated and high degree of pattern can be recognized through the combination of plural kinds of membership functions. It is to be noted that a mere application of the above-described procedure to the setting of the membership functions may lead to another problem.

Figure 13:
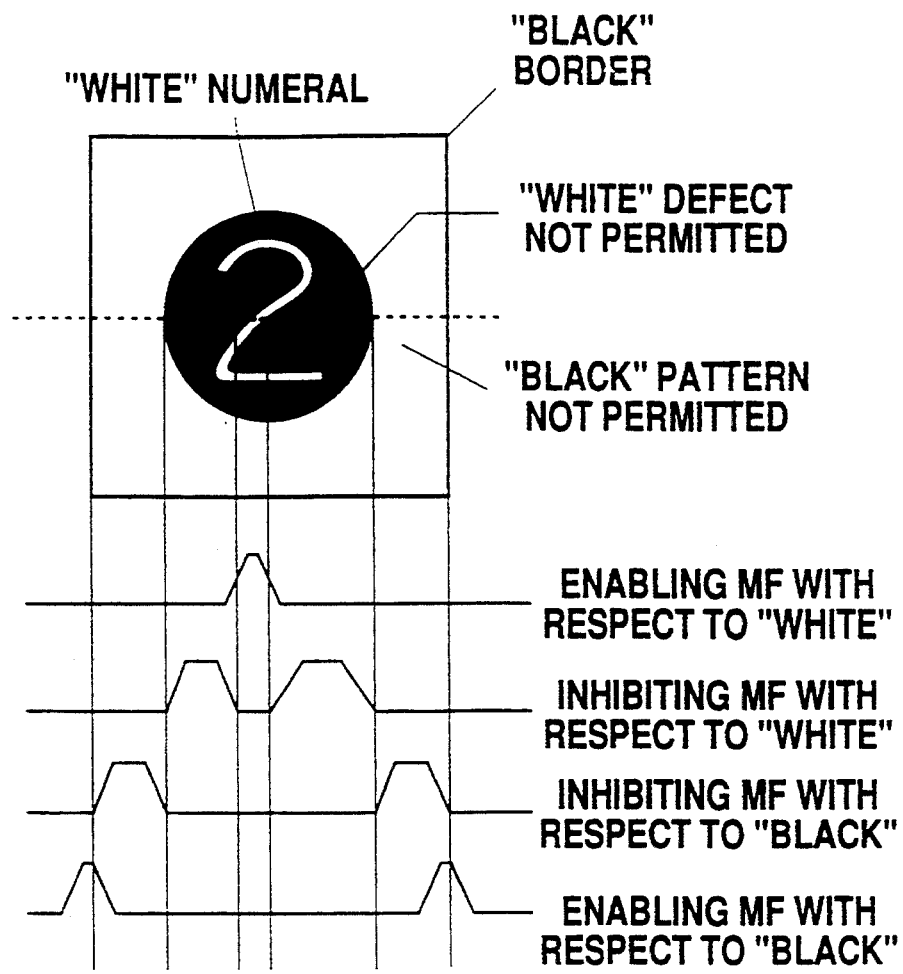
FIG. 13 is a diagram illustrating an example of various types of membership functions for recognizing a pattern "white rectangle with a black border involving a black circle therein, the black circle including a white numeral 2"

For example, consider an object to be recognized as shown in FIG. 13. This is a recognition object where "there is a black border on a white background, the white background extending within the black border line and having at its center a black circle, the black circle including a white numeral 2 therein". A cross-detecting line is provided in such a manner as is shown by a broken line in the figure, and then the recognition object is translated into membership functions in accordance with the procedure described hereinabove. Thus there can be obtained four kinds of membership functions as shown in the figure.

A first membership function is one for recognizing the white numeral "2" on the black circle. This membership function is an enabling membership function with respect to white with the aim of confirming the presence of the white numeral "2" on the black circle. A second membership function is one for recognizing the black circle. This membership function is to be an inhibiting membership function with respect to white in view of not permitting the presence of white defects on the black circle. As the black circle is halved by the white numeral "2" along the cross-detecting line herein, the second membership function is to have a couple of peaks. A third membership function is one for recognizing the white background surrounding the black circle. This membership function is to be an inhibiting membership function with respect to black in view of not permitting the presence of black defects on the white background. As the white background is halved by the black circle along the cross-detecting line herein, the third membership function is to have a couple of peaks. Finally, the fourth membership function is one for recognizing the black border. This membership function is to be an enabling membership function with respect to black for the purpose of confirming the presence of the black border. As the black border will intersect the cross-detecting line twice herein, the fourth membership function is to have a couple of peaks.

As is apparent from the FIG. 13 example, however, more and more membership functions must be used accordingly as the recognition object becomes more complicated. Furthermore, a greater number of peaks of the membership function are required accordingly as the recognition object becomes more complicated.

Thus, for the setting and definition of the membership functions in accordance with the above-described procedure, the membership functions are defined depending on such circumstances as which of white or black is to be regarded as a pattern, and whether the defects are essential or not. Accordingly, a more complicated object to be recognized requires a more complicated definition of the membership functions.

Details of Embodiments

Such complicated definition will be made possible by an embodiments of the present invention described hereinbelow. According to the following embodiment, it becomes possible to handle a more complicated object to be recognized and to satisfy a wider recognition object.

Figure 14:
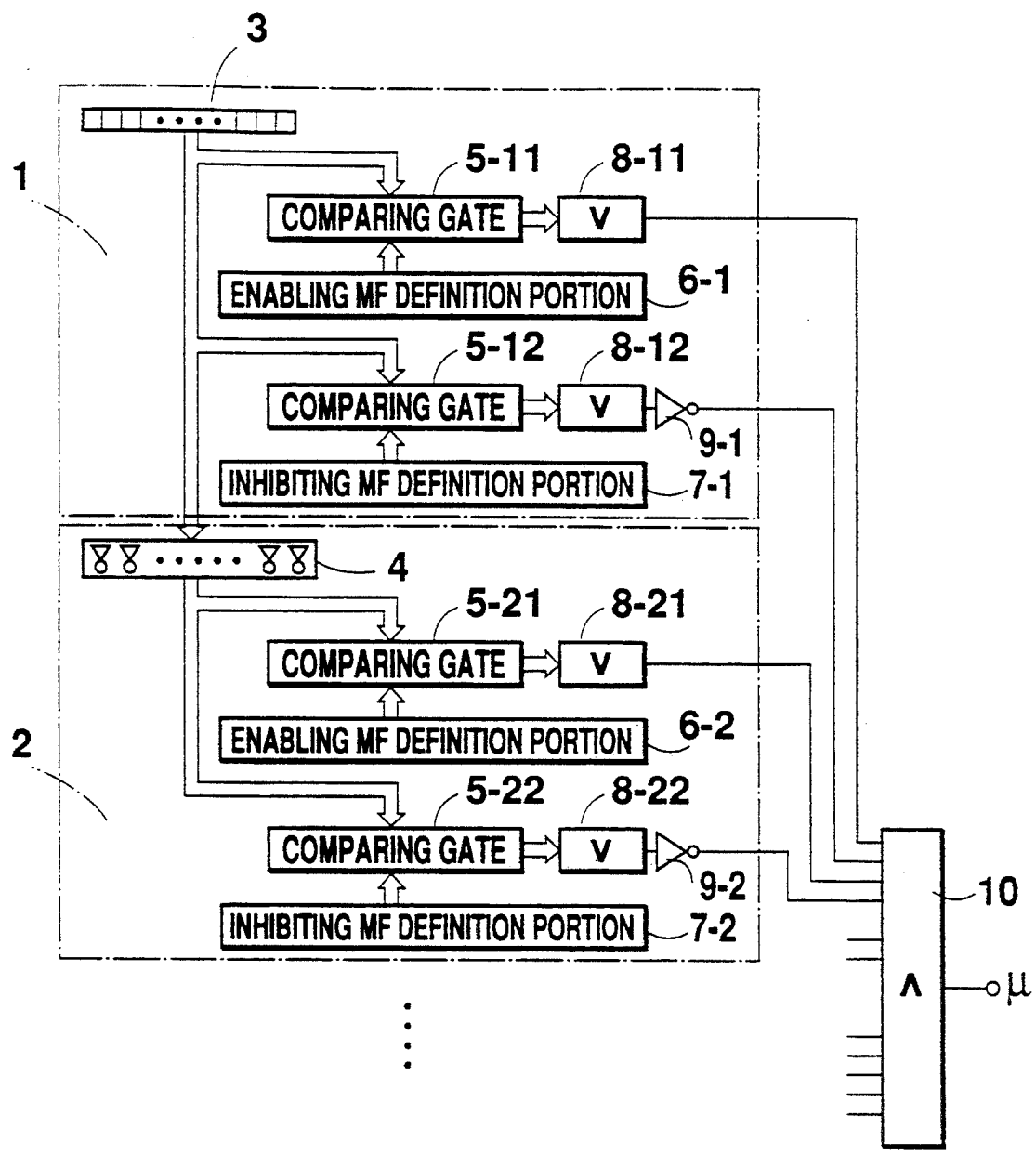
FIG. 14 is a block diagram showing an overall configuration of a fuzzy neuron in accordance with a first embodiment of the present invention.

FIG. 14 illustrates a configuration of a fuzzy neuron in accordance with a first embodiment of the present invention. The fuzzy neuron shown generally comprises a plurality of matching sections and a minimum value output section 10. In this figure, for the purpose of simplification only a pair of matching sections are shown, designated at reference numeral 1 and 2, respectively.

The matching section 1 includes a sensor portion 3 to be embodied in the form of, for example, a sensor array or a charge coupled device (CCD). The sensor portion 3 acts as a means for inputting an input pattern, and the arrangement thereof constitutes a cross-detecting line. Therefore, output of the sensor portion 3 corresponds to the distributing signals described above. The matching section 2 which is a counterpart of the matching section 1 includes a distributing signal inverting portion 4 which inverts the distributing signals received from the sensor portion 3.

The matching section 1 comprises comparing gates 5-11 and 5-12, an enabling membership function definition portion 6-1, an inhibiting membership function definition portion 7-1, maximum value output portions 8-11 and 8-12, and an inverter 9-1. The matching section 2 comprises comparing gates 5-21 and 5-22, an enabling membership function definition portion 6-2, an inhibiting membership function definition portion 7-2, maximum value output portions 8-21 and 8-22, and an inverter 9-2.

In the matching section 1, the distributing signals output from the sensor portion 3 are supplied into the comparing gates 5-11 and 5-12, respectively. The comparing gate 5-11 inputs values of an enabling membership function defined by the enabling membership function definition portion 6-1, while the comparing gate 5-12 inputs values of an inhibiting membership function defined by the inhibiting membership function definition portion -1. The enabling membership function definition portion 6-1 and the inhibiting membership function definition portion 7-1 may be both comprised of, for example, shift registers.

The comparing gate 5-11 compares and collates values of the enabling membership function defined by the enabling membership function definition portion 6-1 with the distributing signals supplied from the sensor portion 3, to thereby output membership function values corresponding to the location where the distributing signal values belong to a predetermined range. For example, the comparing gate 5-11 outputs the membership function values corresponding to the locations where input distributing signal values are "black". The comparing gate 5-12 compares and collates values of the inhibiting membership function defined by the inhibiting membership function definition portion 7-1 with the distributing values supplied from the sensor portion 3, to thereby output membership function values corresponding to the locations where the distributing signal value belong to a predetermined range. For example, the comparing gate 5-12 also outputs the membership function values corresponding to the locations where input distributing signal values are "black".

The comparing gates 5-11 and 5-12 are followed by the maximum value output portions 8-11 and 8-12, respectively. The maximum value output portion 8-11 detects the maximum values of the membership function values received from the comparing gate 5-11, and supplies them into the minimum value output portion 10. The maximum value output portion 8-12 detects the maximum value of the membership function values received from the comparing gate 5-12, and supplies them into the inverter 9-1. The inverter 9-1 logically inverts thus supplied maximum value and supplies it into the minimum output portion 10.

In the matching section 2, on the contrary, the inverted distributing signals received from the distributing signal inverting portion 4 are supplied into the comparing gates 5-21 and 5-22, respectively. Within the comparing gate 5-21 there is defined an enabling membership function by means of the enabling membership function definition portion 6-2, while within the comparing gate 5-22 there is defined an inhibiting membership function by means of the inhibiting membership function definition portion 7-2. The enabling membership function definition portion 6-2 and the inhibiting membership definition portion 7-2 may be both comprised of, for example, shift registers.

The comparing gate 5-21 compares and collates values of the enabling membership function defined by the enabling membership function definition portion 6-2 with the distributing signals supplied from the distributing signal inverting portion 4, to thereby output membership function values corresponding to the locations where the distributing signals values belong to a predetermined range. For example, the comparing gate 5-21 outputs the membership function values corresponding to the locations where input distributing signal values are "black". The comparing gate 5-22 compares and collates values of the inhibiting membership function defined by the inhibiting membership function definition portion 7-2 with the distributing values supplied from the distributing signal inverting portion 4, to thereby output membership function values corresponding to the locations where the distributing signal values belong to a predetermined range. For example, the comparing gate 5-22 also outputs the membership function values corresponding to the locations where input distributing signal values are "black".

The comparing gates 5-21 and 5-22 are accompanied by the maximum value output portions 8-21 and 8-22, respectively. The maximum value output portion 8-21 detects the maximum value of the membership function values received from the comparing gate 5-21, and supplies it into time minimum value output portion 10. The maximum value output portion 8-22 detects the maximum value of the membership function values received from the comparing gate 5-22, and supplies it into the inverter 9-2. The inverter 9-2 logically inverts thus supplied maximum value and supplies it into the minimum output portion 10.

The minimum value output portion 10 detects a minimum among the supplied maximum values or the inverted values of the maximum values, and outputs it as an output value u. The output value u indicates to what degree an input pattern matches the reference pattern represented by the membership functions.

Accordingly, the enabling membership function to be defined by the enabling membership function definition portion 6-1 becomes an enabling membership function with respect to black, while the inhibiting membership function to be defined by the inhibiting membership function definition portion 7-1 becomes an inhibiting membership function with respect to black. Furthermore, since the black distributing signals are inverted into white ones and the white distributing signals are inverted into black ones by virtue of the distributing signal inverting portion 4, the enabling membership function to be defined by the enabling membership function definition portion 6-2 becomes a enabling membership function with respect to white, while the inhibiting membership function defined by the inhibiting membership function definition portion 7-2 becomes an inhibiting membership function with respect to white. Using a simple circuit configuration in this manner a total of four kinds of membership functions can be defined and the Judgment of degree of matching can be performed In this embodiment. In other words, it enables a complicated definition of the membership functions suitable for a complicated and high degree of object to be recognized, which may remarkably enlarge the application of the fuzzy neuron. Although only a pair of matching sections are shown in FIG. 14, the present invention may use three or more matching sections, and is not intended to be limited to the use of only the pair of matching sections.

In the case of providing a plurality of cross-detecting lines, for example, it is preferable to be capable of defining four kinds of membership functions for each of the cross-detecting lines, and hence plural pairs of matching sections must be used. Furthermore, in order to avoid presenting a plurality of peaks as shown in FIG. 13, the membership function having a plurality of peaks must be divided into a plurality of membership functions each having a single peak. In tills case, each of the membership functions must be subjected to the matching, which requires plural pairs of matching sections. It depends on the object of recognition whether the membership function should remain with a plurality of peaks or should be divided into a plurality of membership functions each having a single peak.

Figure 15:
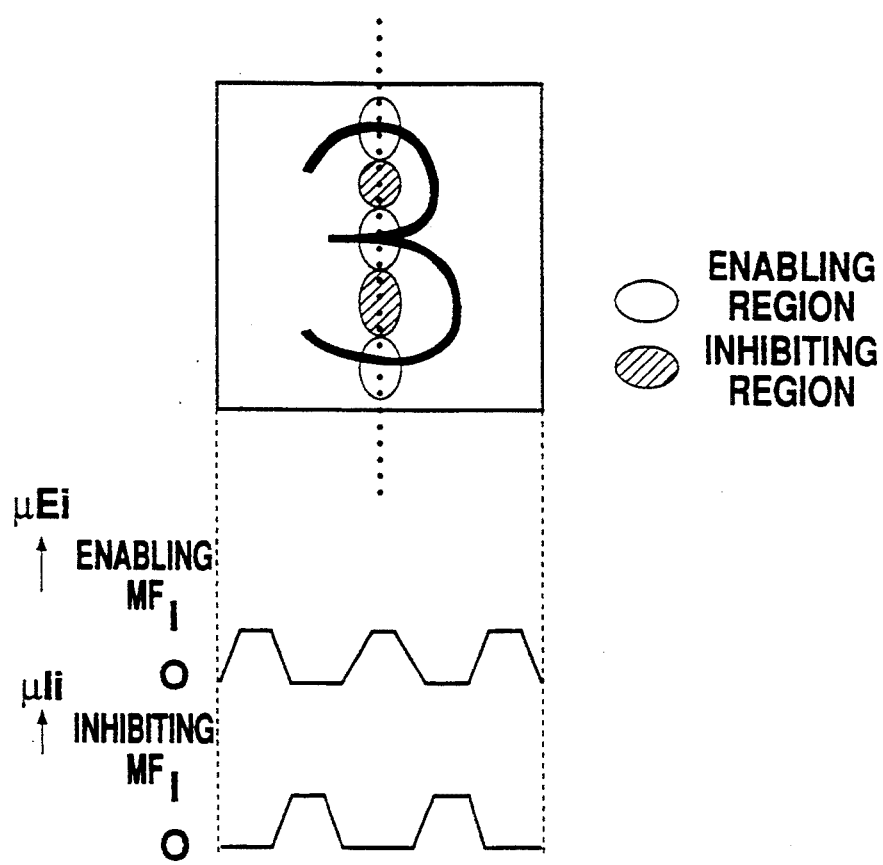
FIG. 15 is a diagram illustrating an example of various types of membership functions defined to have a plurality of peaks.

In the case where a handwritten letter "3" shown in FIG. 15 is required to be recognized by use of the fuzzy neuron of this embodiment, a cross-detecting line is provided, for example, in such a manner as shown by a broken line in the figure. When considering this case by way of example, it is also shown that it is possible to define an enabling membership function having three peaks corresponding to three enabling regions and to define an inhibiting membership function having two peaks corresponding to two inhibiting regions.

Figure 16:
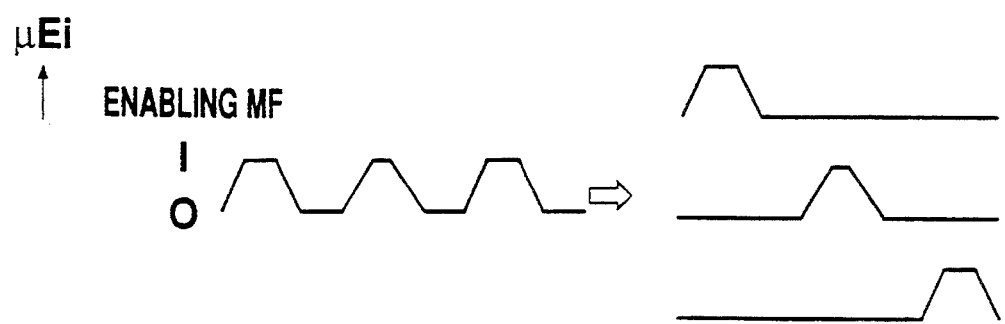
FIG. 16 is a diagram for explaining a conception of dividing the enabling membership function having a plurality of peaks shown in FIG. 15 into a plurality of enabling membership functions each having a single peak.

However, if an applied input pattern, which belongs in a different category to the reference pattern, satisfies any one of the enabling conditions corresponding to a plurality of peaks, the judgment result will be the same as the result obtained when the pattern belonging to the same category with the reference pattern is input i.e. obtained in the case where all of the peaks satisfy the enabling condition, since the operation for the Judgment of degree of matching concerning the enabling membership function is a maximum value operation of the membership function values. Such Judgment is unsuitable for the case shown in FIG. 15 where the enabling conditions are required to be satisfied at all of the enabling regions. In order to prevent such erroneous judgment due to the OR property of the enabling membership having a plurality of peaks, the membership function having a plurality of peaks has to be divided into a plurality of membership functions each having a single peak as shown in FIG. 16.

Figure 17:
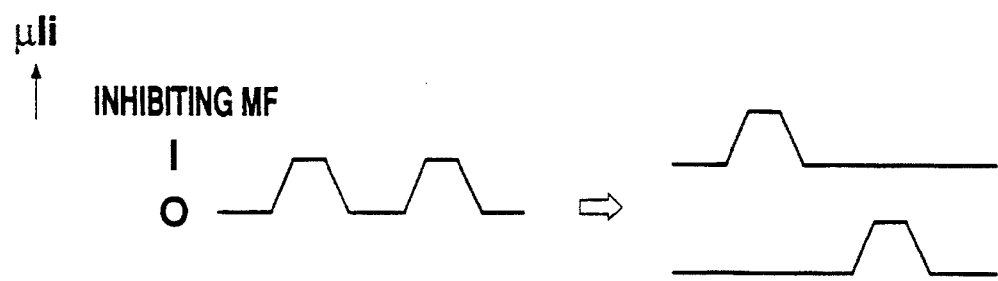
FIG. 17 is a diagram for explaining a conception of dividing the inhibiting membership function having a plurality of peaks shown in FIG. 15 into a plurality of inhibiting membership functions each having a single peak.

Since the operation for the Judgment of degree of matching concerning the inhibiting membership function can be considered also as the inversion operation of the maximum of the membership function values, if an input pattern which does not satisfy all inhibiting conditions is applied, the judgment result will be the same as that in the case where only any one of the inhibiting conditions are not satisfied. In order to prevent such erroneous judgment due to the AND property of the inhibiting membership function having a plurality of peaks, the membership function having a plurality of peaks may be divided into a plurality of membership functions each having a single peak, as shown in FIG. 17.

It depends on the properties of the object to be recognized and the object of recognition as to whether the membership function is to have a plurality of peaks or divided to have a single peak. It is therefore preferable in general to provide a greater number of pairs of matching sections than the number of cross-detecting lines so as to be capable of dividedly having a single peak.

Figure 18:
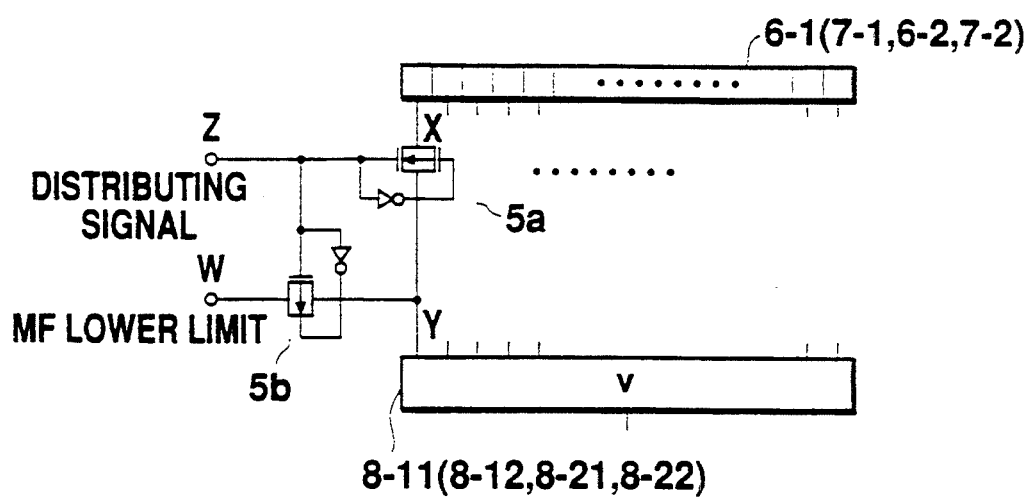
FIG. 18 is a diagram illustrating, by way of example, a configuration of a comparing gate.

FIG. 18 illustrates a configuration of the comparing gates 5-11 to 5-22 by way of example. This configuration employs transmission gates. This configuration comprises gates 5a and 5b. For the convenience of description, the comparing gate 5-11 will be described as an example, but the following discussion will be applied to the other comparing gates 5-12 to 5-22 as well.

As shown in this figure, the gates 5a and 5b are interposed between an enabling membership function definition portion 6-1 which is embodied as a register for storing membership function values, and a maximum value output portion 8-11. Corresponding to respective bits of the enabling membership function definition portion 6-1, there are provided plural pairs of gates 5a and 5b (the number of pairs corresponding to the number of sampling points along a cross-detecting line).

Distributing signals derived from a sensor portion 3 are input into the gates 5a and 5b by way of a terminal Z in the figure. If values of the distributing signals input through the terminal Z are larger than a predetermined value, then the gate 5a acts to connect between X and Y. On the contrary, if values of the distributing signals input through the terminal Z are less than the predetermined value, then the gates 5a acts to disconnect X from Y. As a result, only in the case where the distributing signal at corresponding location are sufficiently high, each bit of the membership function supplied into the maximum is value output portion 8-11. The values "high" of the distributing signals correspond to, for example, "black".

The gate 5b acts to connect W and Y when the values of the distributing signals input through the terminal Z are sufficiently low. The terminal W inputs a preset lower limit value which the membership function can take. The provision of such gate 5b prevents the input into the maximum value output portion 8-1 from being indefinite or unstable values when the values of the distributing signal are sufficiently low.

Figure 19:
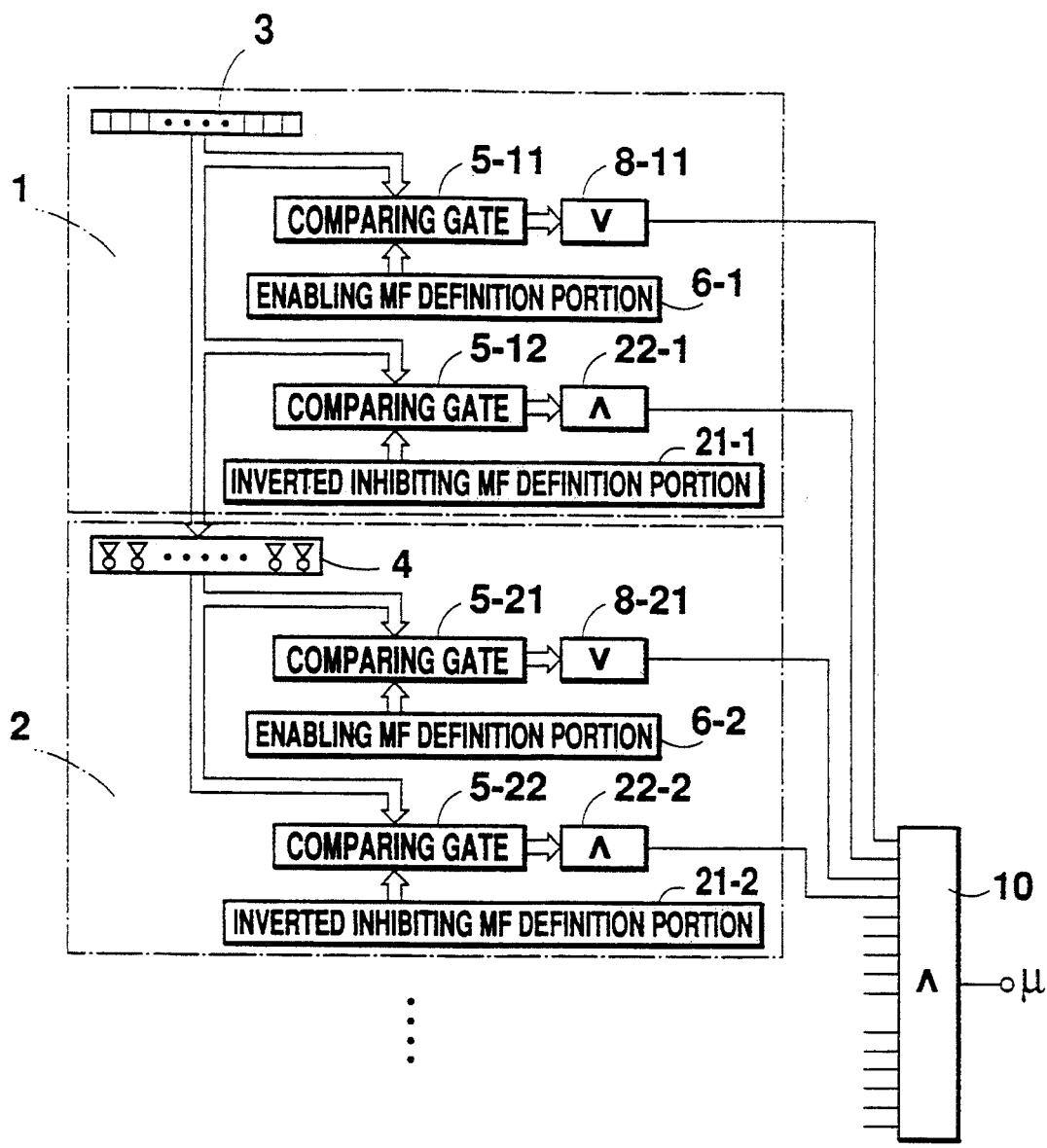
FIG. 19 is a block diagram illustrating an overall configuration of a fuzzy neuron in accordance with a second embodiment of the present invention.

FIG. 19 illustrates a configuration of a fuzzy neuron in accordance with a second embodiment of the present invention. It is to be noted that elements identical with those in the first embodiment are designated at the same reference numerals, and the description thereof will not be repeated.

In this embodiment, the inhibiting membership function definition portions 7-1 and 7-2 and the maximum value output portion 8-12 and 8-22 are replaced by inversion inhibiting membership function definition portions 21-1 and 21-2 and minimum value output portions 22-1 and 22-2, respectively. The inverters 9-1 and 9-2 are not in use. This embodiment employs (uIi) obtained through a modification of vuIi based on de Morgan's theorem.

Accordingly, this embodiment can also present the same effect as that in the first embodiment. More specifically, it becomes possible to independently define the enabling and inhibiting membership functions with respect to either white or black, since inverted distributing signal values as well as the distributing signal values are subjected to matching with the membership function. Thus, the content of representation of the reference pattern is widened to enable the recognition of a more complicated and higher degree of pattern or the recognition for a more extensive object.

What is claimed is:

1. A fuzzy neuron comprising:
   means for inputting and sampling an input pattern along a cross-detecting line, which crosses at least any one of a first enabling region, a first inhibiting region, a second enabling region, and a second inhibiting region;
   means for logically inverting said input pattern to produce an inverted input pattern;
   means for defining a first enabling membership function based on a first enabling condition in which a predetermined reference pattern passes through said first enabling region; said first enabling membership function having its maximum within said first enabling region;
   means for defining a first inhibiting membership function based on a first inhibition condition in which said predetermined reference pattern does not pass through said first inhibiting region; said first inhibiting membership function having its maximum within said first inhibiting region;
   means for deriving values of said first enabling membership function at a first set of points on said cross-detecting line at which sampling values belonging to a predetermined range are obtained;
   means for deriving a maximum of the values derived by said first enabling membership function values deriving means;
   means for deriving values of said first inhibiting membership function at said first set of points;
   means for deriving a maximum of the values derived by said first inhibiting membership function values deriving means;
   means for logically inverting the maximum derived by said first inhibiting membership function maximum deriving means;
   means for defining a second enabling membership function based on a second enabling condition in which a background of said predetermined reference pattern passes through said second enabling region; said second enabling membership function having its maximum within said second enabling region;
   means for defining a second inhibiting membership function based on a second inhibiting condition in which the background of said predetermined reference pattern does not pass through said second inhibiting region; said second inhibiting membership function having its maximum within said second inhibiting region;
   means for deriving values of said second enabling membership function at a second set of points on said cross-detecting line at which sampling values whose inverted values belong to the predetermined range are obtained;
   means for deriving a maximum of the values derived by said second enabling membership function values deriving means;
   means for deriving values of said second inhibiting membership function at said second set of points;
   means for deriving a maximum of the values derived by said second inhibiting membership function values deriving means;
   means for logically inverting the maximum derived by said second inhibiting membership function maximum deriving means; and
   means for deriving a minimum value for among (i) the maximum derived by said first enabling membership function maximum deriving means, (ii) an inverted maximum derived by said first inhibiting membership function maximum inverting means, (iii) a maximum derived by said second enabling membership function maximum deriving means, and (iv) an inverted maximum derived by said second inhibiting membership function maximum inverting means;

said input pattern being recognized as a pattern belonging to the same category as said predetermined reference pattern when the minimum value is sufficiently large.

2. A fuzzy neuron according to claim 1, wherein each of the input pattern, the inverted input pattern, the first and second enabling membership functions, and the first and second inhibiting membership functions is composed of a plurality of bits; wherein each of the first enabling membership function defining means, the first inhibiting membership function defining means, the second enabling membership function defining means, and the second inhibiting membership function defining means includes register means for holding the plurality of bits corresponding to at least one of (i) the first enabling membership function, (ii) the first inhibiting membership function, (iii) the second enabling membership function, and (iv) the second inhibiting membership function; wherein each of the first enabling membership function value deriving means, the first inhibiting membership function value deriving means, the second enabling membership function value deriving means and the second inhibiting membership function value deriving means comprises:

a plurality of first gates, provided with respect to the bits held in the register means, for supplying bits at at least one of the first and second set of points to a corresponding one of the first enabling membership function maximum deriving means, the first inhibiting membership function maximum deriving means, the second enabling membership function maximum deriving means, and the second inhibiting membership function maximum deriving means; and a plurality of second gates, provided with respect to the bits held in the register means, for supplying bits at other than the first and second set of points to the corresponding one means.

3. A fuzzy neuron comprising:

means for inputting and sampling an input pattern along a cross-detecting line, which crosses at least any one of a first enabling region, a first inhibiting region, a second enabling region, and a second inhibiting region;

means for logically inverting said input pattern to produce an inverted input pattern;

means for defining a first enabling membership function based on a first enabling condition in which a predetermined reference pattern passes through said first enabling region; said first enabling membership function having its maximum within said first enabling region;

means for defining a first inverted inhibiting membership function based on a first inhibition condition in which said predetermined reference pattern does not pass through said first inhibiting region; said first inverted inhibiting membership function having its minimum within said first inhibiting region;

means for deriving values of said first enabling membership function at a first set of points on said cross-detecting line at which sampling values belonging to a predetermined range are obtained;

means for deriving a maximum of the values derived by said first enabling membership function values deriving means;

means for deriving values of said first inverted inhibiting membership function at said first set of points;

means for deriving a minimum of the values derived by said first inverted inhibiting membership function values deriving means;

means for defining a second enabling membership function based on a second enabling condition in which a background of said predetermined reference pattern passes through said second enabling region; said second enabling membership function having its maximum within said second enabling region;

means for defining a second inverted inhibiting membership function based on a second inhibiting condition in which the background of said predetermined reference pattern does not pass through said second inhibiting region; said second inverted inhibiting membership function having its minimum within said second inhibiting region;

means for deriving values of said second enabling membership function at a second set of points on said cross-detecting line at which sampling values whose inverted values belong to the predetermined range are obtained;

means for deriving a maximum of the values derived by said second enabling membership function values deriving means;

means for deriving values of said second inverted inhibiting membership function at said second set of points;

means for deriving a minimum of the values derived by said second inverted inhibiting membership function values deriving means; and means for deriving a result as a minimum value from among (i) the maximum derived by said first enabling membership function maximum deriving means, (ii) the minimum derived by said first inverted inhibiting membership function minimum deriving means, (iii) the maximum derived by said second enabling membership function maximum deriving means, and (iv) the minimum derived by said second inverted inhibiting membership function minimum deriving means;

said input pattern being recognized as a pattern belonging to the same category as said predetermined reference pattern when the minimum derived by the result deriving means is sufficiently large.

4. A fuzzy neuron according to claim 3, wherein each of the input pattern, the inverted input pattern, the first and second enabling membership functions, and the first and second inhibiting membership functions comprises a plurality of bits; wherein each of the first enabling membership function defining means, the first inverted inhibiting membership function defining means, the second enabling membership function defining means, and the second inverted inhibiting membership function defining means includes register means for holding the plurality of bits corresponding to one of the first enabling membership function, the first inverted inhibiting membership function, the second enabling membership function, and the second inverted inhibiting membership function; wherein each of the first enabling membership function value deriving means, the first inverted inhibiting membership function value deriving means, the first inverted inhibiting membership function value deriving means, the second enabling membership function value deriving means, and the second inverted inhibiting membership function value deriving means comprises:

a plurality of first gates, provided with respect to the bits held in the register means, for supplying bits at at least one of the first and second set of points to a corresponding one of the first enabling membership function maximum deriving means, the first inverted inhibiting membership function maximum deriving means, the second enabling membership function maximum deriving means, and the second inverted inhibiting membership function maximum deriving means, and a plurality of second gates, provided with respect to the bits held in the register means, for supplying bits at other than the first or second set of points to the corresponding one means.

* * * * *

UNITED STATES PATENT AND TRADEMARK OFFICE
CERTIFICATE OF CORRECTION

PATENT NO. : 5,434,930
DATED : July 18, 1995
INVENTOR(S) : Fumiaki Shigeoka et al.

It is certified that error appears in the above-indentified patent and that said Letters Patent is hereby corrected as shown below:

On the title page, Item [54] Please correct the title to read
--FUZZY NEURON FOR PATTERN RECOGNITION--.

Signed and Sealed this

Eighteenth Day of June, 1996

Attest:

BRUCE LEHMAN

*Attesting Officer*     *Commissioner of Patents and Trademarks*